United States Patent [19]

Lysen

[11] Patent Number: 5,691,904
[45] Date of Patent: Nov. 25, 1997

[54] PROCESS AND DEVICE FOR DETERMINING THE CONDITION OF MACHINES WITH SEVERAL MEASURING POINTS

[75] Inventor: Heinrich Lysen, Garching, Germany

[73] Assignee: Pruftechnik Dieter Busch AG, Ismaning, Germany

[21] Appl. No.: 387,878

[22] PCT Filed: Jun. 22, 1994

[86] PCT No.: PCT/EP94/02035

§ 371 Date: Feb. 22, 1995

§ 102(e) Date: Feb. 22, 1995

[87] PCT Pub. No.: WO95/00930

PCT Pub. Date: Jan. 5, 1995

[30] Foreign Application Priority Data

Jun. 22, 1993 [DE] Germany .................. 43 20 657.3

[51] Int. Cl.⁶ .................. G06G 7/78; G01B 5/004
[52] U.S. Cl. .................. 364/460; 364/550; 364/474.37; 364/551.02; 364/474.17; 33/503; 33/553; 33/554; 318/578; 318/602; 235/376; 235/451; 73/37.9; 73/660; 73/661
[58] Field of Search .................. 364/563, 561, 364/191, 921, 524.01, 474.01, 474.02, 474.16, 474.17, 474.19, 474.37, 560, 551.02, 550, 474.35, 167.01, 571.01, 474.06, 460, 474.34; 33/503, 1 M, 1 MP, 1 PT, 819, 552, 504, 520, 558, 568, 505, 550, 561, 553; 377/24; 395/183; 318/602, 685, 696, 39

[56] References Cited

U.S. PATENT DOCUMENTS

| 4,074,624 | 2/1978 | Biörnstad et al. | 100/35 |
|---|---|---|---|
| 4,283,669 | 8/1981 | Jacoby | 364/474.37 |
| 4,490,914 | 1/1985 | Spies | 33/700 |
| 4,631,404 | 12/1986 | Burkhardt et al. | 33/707 |
| 4,651,291 | 3/1987 | Nishimura | 364/550 |
| 4,719,703 | 1/1988 | Ross et al. | 33/503 |
| 4,800,512 | 1/1989 | Busch | 364/551.01 |
| 5,097,119 | 3/1992 | Breitmeir | 250/201.4 |
| 5,152,166 | 10/1992 | Brock et al. | 73/37.9 |
| 5,189,806 | 3/1993 | McMurtry et al. | 33/503 |

FOREIGN PATENT DOCUMENTS

| 0023879 | 2/1981 | European Pat. Off. . |
|---|---|---|
| 0311023 | 4/1989 | European Pat. Off. . |
| 0194333 | 9/1986 | Germany . |
| 0211212 | 2/1987 | Germany . |

*Primary Examiner*—Jacques Louis-Jacques
*Attorney, Agent, or Firm*—Kirkpatrick & Lockhart LLP

[57] ABSTRACT

The proposal is for a process and device making it possible to determine the condition of one or more machines (3) at several measuring points by means of a measuring head (MK) with measurement transducers (MW) which can be releasably fitted there and to supply to a computer the relevant measurement signal together with the characteristic data therefore obtained at the measuring point concerned. The invention lies in the special nature of the obtaining of the characteristic data. For this purpose there are at each measuring point special coding elements (5) adjustable between two possible operating states which work together with an allocated contact device (K, K') in the attached measuring head (MK) and, depending on the set operating state, permanently affect it or leave it unaffected, from which a characteristic electric signal is generated in the measuring head (MK) for each contact device (L, K') which, depending on the operative position of the appropriate coding element (5), has one or other two different possible values. The individual electric signals generated for each coding element are then fed into the computer in parallel or series as the characteristic signal of the relevant measuring point.

18 Claims, 4 Drawing Sheets

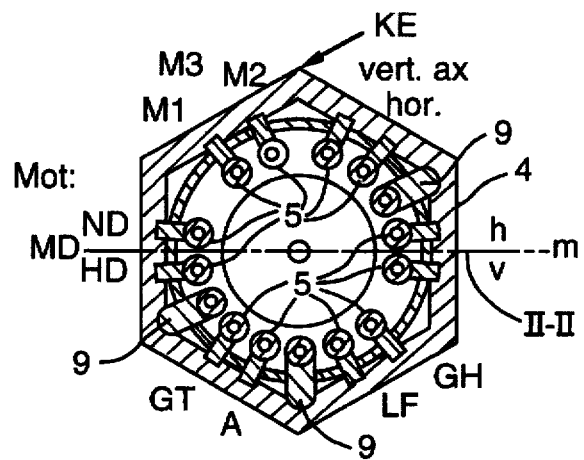
FIG. 1
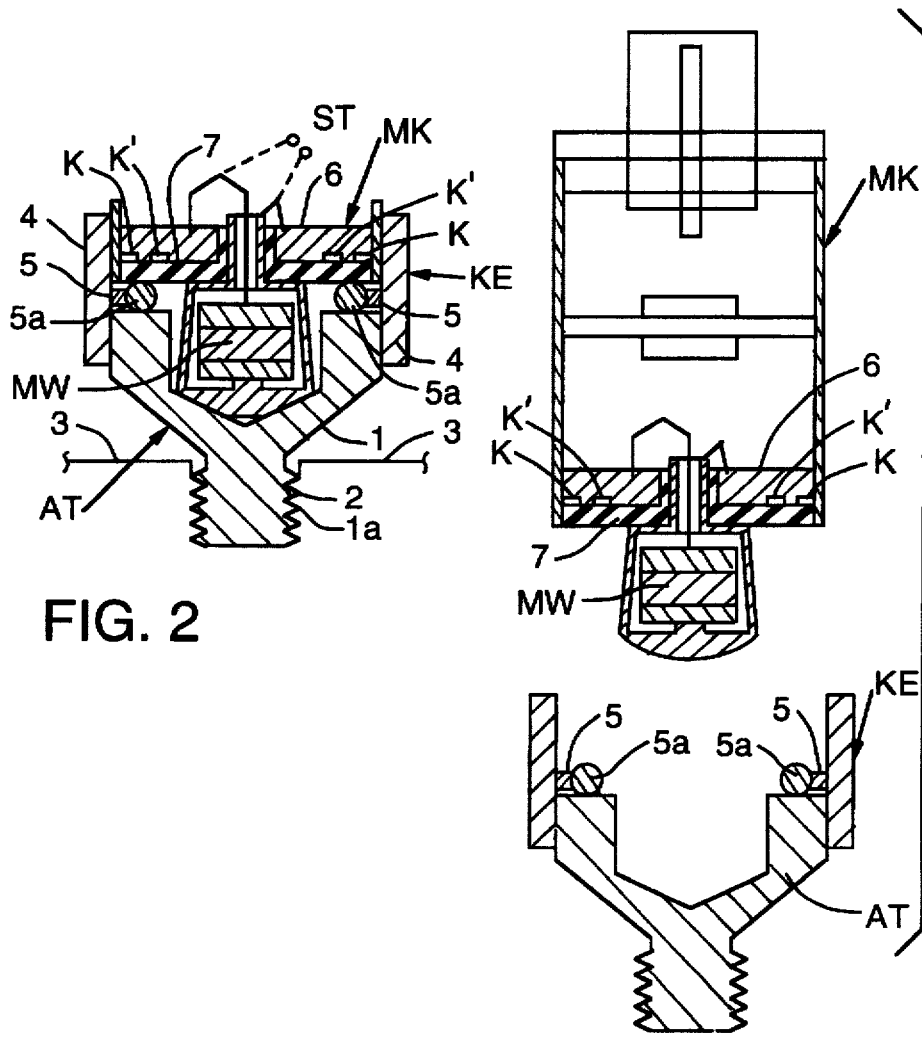
FIG. 2
FIG. 3

```
┌─────────────────────────────────────────────────────────────┐
│ DEFINING A PLURALITY OF ENCODING ELEMENTS, WITH EACH        │
│ ENCODING ELEMENT HAVING A PLURALITY OF WORKING CONDITIONS,  │
│ AND EACH ENCODING ELEMENT IS DEFINED IN ONE OF THE          │
│ WORKING CONDITIONS                                          │
└─────────────────────────────────────────────────────────────┘
                              │
                              ▼
┌─────────────────────────────────────────────────────────────┐
│ ENGAGING A PLURALITY OF CONTACT UNITS WITH THE PLURALITY OF │
│ ENCODING ELEMENTS, SO THAT EACH CONTACT UNIT REFLECTS THE   │
│ WORKING CONDITION OF AN ENCODING ELEMENT                    │
└─────────────────────────────────────────────────────────────┘
                              │
                              ▼
┌─────────────────────────────────────────────────────────────┐
│ GENERATING AN ELECTRIC SIGNAL FOR EACH CONTACT UNIT, THE    │
│ ELECTRIC SIGNAL BEING INDICATIVE OF THE WORKING CONDITION OF│
│ THE ENCODING ELEMENT, WHEREIN THE ELECTRIC SIGNAL           │
│ IS GENERATED BY :                                           │
│                                                             │
│     PROVIDING AN INPUT SIGNAL TO THE CONTACT UNIT, THE INPUT│
│     SIGNAL HAVING A MAGNATUDE, AND                          │
│                                                             │
│     INFLUENCING THE MAGNATUDE OF THE INPUT SIGNAL AS A      │
│     FUNCTION OF THE WORKING CONDITION OF THE ENCODING       │
│     ELEMENT TO GENERATE THE ELECTRIC SIGNAL BY VARYING THE  │
│     RESISTANCE OF A CONDUCTIVE PATHWAY FOR THE INPUT SIGNAL │
└─────────────────────────────────────────────────────────────┘
                              │
                              ▼
┌─────────────────────────────────────────────────────────────┐
│ IDENTIFYING THE MEASURING SITE BASED ON THE ELECTRIC SIGNALS│
│ REPRESENTATIVE OF THE WORKING CONDITIONS OF THE ENCODING    │
│ ELEMENTS                                                    │
└─────────────────────────────────────────────────────────────┘
```

FIG. 9

PROCESS AND DEVICE FOR DETERMINING THE CONDITION OF MACHINES WITH SEVERAL MEASURING POINTS

BACKGROUND OF THE INVENTION

Field of the Invention

The invention concerns a method for determining a condition of a machine at several predetermined measuring sites, and a device suitable for carrying out this method.

A method and a device of this kind are disclosed by DE 3523289 C 2. According to this state of the art, in order to form the characteristic data of the particular measuring sites, during or after mounting the measuring head on the mounting piece, optical, magnetic or mechanical encoding elements on the mounting piece are scanned in sequence by means of a scanning device provided in the measuring head by moving the scanning device past the encoding elements. In a familiar embodiment, this occurs by making use of the approach movement of the measuring head when placed on the mounting piece, and in other familiar embodiments it is accomplished in that the scanning device, after the measuring head is firmly placed on the mounting piece, is moved by means of a motor drive built into the measuring head. In the first case, special care is required on the part of the attendant, and in the latter case the drive causes considerable structural expense and requires a relatively large measuring head. In either case, only a relatively small number of the different maximum possible encoding for the measuring sites can be accomplished with reasonable structural expense, using a measuring head that is still easy to handle.

SUMMARY OF THE INVENTION

The purpose of the invention is to create a method according to the general concept of patent claim 1, which makes it possible to quickly and reliably identify and interrogate a rather large number of measuring sites, without requiring special care on the part of the person handling the measuring head, and to do so with structurally simple equipment.

This purpose is accomplished by defining several encoding elements, with each encoding element having a plurality of working conditions, and each encoding element defined in one of the working conditions. Engaging several contact units with several encoding elements, so that each contact unit reflects the working condition of each encoding element. Generating an electric signal for each contact unit, the electric signals being indicative of the working condition of the encoding elements. Identifying a machine based on the electric signals representative of the working conditions of the encoding elements.

The invention is preferably embodied in an apparatus producing signals identifying a machine. The apparatus includes a mounting piece attached to the machine. Several encoding elements are attached to the mounting piece and arranged in a fixed special pattern, with each encoding element having several working conditions, and with the encoding elements collectively acting as an identification of the machine. A head assembly can be brought into engagement with the mounting piece. Several contact units are attached to the head assembly, with each contact unit corresponding to one encoding element. A circuit carried by the head assembly generates several electric signals which are indicative of the working conditions of encoding elements. A circuit for receiving the electric signals and a circuit for identifying a machine based on the electric signals representative of the working conditions of the encoding elements are also provided.

Subsidiary claims deal with preferred configurations of the method. The invention also a creates a device to carry out the method that is especially advantageous in respect of operating mode, operating safety, and structural expense.

Subsidiary claims also concern preferred embodiments of the device.

A preferred modification of the device makes it possible to involve, in the monitoring process according to the invented method and using the invented device, even those measuring sites which are in accessible for any reason, e.g., because of construction.

Features allow the user of the invented device to individually organize the encoding of the individual measuring sites in very simple fashion according to his own notions, if necessary only after being installed.

BRIEF DESCRIPTION OF THE DRAWINGS

The invention is described more closely by means of the drawing with simple embodiments. The drawing shows:

FIG. 1 a mounting piece in top view, looking along arrow I in FIG. 2.

FIG. 2 the mounting piece per FIG. 1 in lengthwise section along line II—II in FIG. 1 with the lower part of the measuring head mounted thereon.

FIG. 3 mounting piece and measuring head in separate state, seen from the side.

FIG. 9 is a flow chart illustrating a method of identifying a measuring site on a machine in accordance with the present invention.

DETAILED DESCRIPTION OF THE PREFERRED EMBODIMENTS

Figure 4:
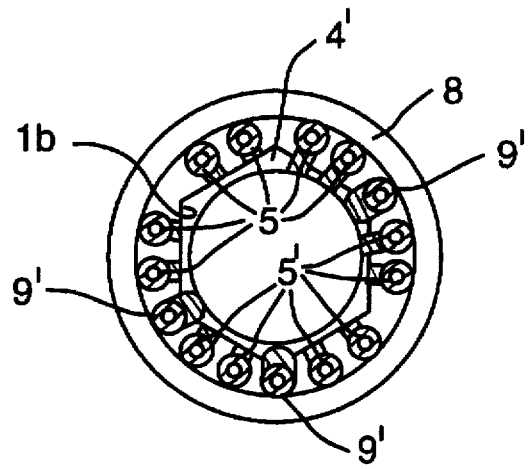
FIG. 4 a modified design of the mounting piece in top view, looking along arrow III in FIG. 5.

The method described hereafter, and the device explained below, make it possible to interrogate measuring sites MS (shown in FIG. 8) on machines in terms of any measured quantities prevailing there, for example, those which are characteristic of the degree of wear, one after the other from time to time by means of a measuring head MK, which is handled by an attendant, and enter the data into a computer. Each time, the computer automatically receives data which identify and distinguish the particular measuring site from the other measuring sites. The measuring sites being scanned can be located at many points of the most diverse machines. In the case of installations with several machine cycles for several machines, each with several measuring sites, there may be a very considerable number of measuring sites present, which have to be interrogated.

In order to acquire the measured data and the characteristics, a mounting piece AT is fastened at each measuring site MS, which interacts with the measuring head MK handled by the attendant. A first preferred embodiments of this is shown in FIGS. 1–3.

The mounting piece AT per FIGS. 1–2 has a base 1 with a threading 1a, which is screwed into a threaded hole 2, which is located in the wall of a machine being monitored, only suggested by 3 in FIG. 2, at the particular measuring site MS. The base 1 is fashioned as a hexagon, such as SW17, away from the machine 3, so that it can be firmly fastened in the machine 3 like a screw with a hex head.

Furthermore, the mounting piece AT includes a holder 4, adapted to the hexagonal shape of the base 1 and being mounted on it. From the inner wall of the base 1, encoding elements 5 project inwards, which in the mounted condition of the holder 4 thrust against the front surface of the base 1 with broadened spherical ends, forming pressure bodies 5a. The encoding elements 5 are fashioned so that they are firmly joined to the inner wall of the holder 4, but can be easily removed from it, e.g., by being broken off.

As can be seen from FIG. 1, there are two encoding elements 5 at each of the six straight inner surfaces of the holder 4, i.e., a total of twelve such elements, arranged symmetrically with respect to the respective middle of the surface. Furthermore, three additional encoding elements 9 are attached at three of the six corners, having a stronger connection to the holder 4, because in no case do they have to be removed.

The twelve removable encoding elements 5 are used, in the way yet to be explained below, to encode the particular measuring site MS and have the ability to interact with a particular pair of contacts K, K' located above them when a measuring head MK is in place (FIG. 2). The two contacts K and K' of each contact pair have a certain mutual spacing in radial direction and are bridged by a conductive rubber layer 7 that is joined to them. The conductive rubber layer 7 has a resistance which varies when deformation pressure is applied to the conductive rubber layer 7. The contacts K, K'are arranged inside the measuring head MK on a circuit board 6 in such a position that the respective pressure body 5a with its spherical head presses against the conductive rubber layer 7 between them, so that the conductive rubber between these contacts K, K'has a lower resistance than in the positions where the pressure bodies 5a are removed and, accordingly, the conductive rubber between those contacts K, K' is free of force.

Thus, the pressure bodies 5a, by their presence or absence, make it possible to represent two different values, 0 and 1, of a binary code. As can be seen in FIG. 1, the preferred embodiment represents a twelve-place binary number, corresponding to the number of possible pressure bodies present, which is known to have 4096 different values.

The individual values of this binary number can be specified in that the pressure bodies 5a forming the encoding elements in an appropriate combination are either left in place or broken off. The fact that the twelve pressure bodies 5 can be easily removed from the inner wall of the holder 4 allows the encoding to be done as required, in suitable manner, when the measuring site is being set up.

As can be seen from FIG. 2, the measuring head MK, which can be inserted into the holder 4 from the outside and prevented from rotating, has a measurement transducer MW on its bottom side facing the base 1 of the mounting piece AT. In the present case the transducer MW is a piezoelectric crystal, which can be brought in firm mechanical contact with the machine 3 across the base 1 and is used to convert mechanical oscillations and impacts of the machine, acting in a particular direction, here in the direction of the axis of symmetry of the mounting piece AT and the measuring head MK, into a corresponding electrical signal, which is put into a computer as the measurement signal.

FIG. 3 shows the mounting piece AT and the measuring head MK of the configuration per FIGS. 1 and 2 before being fitted together.

Figure 5:
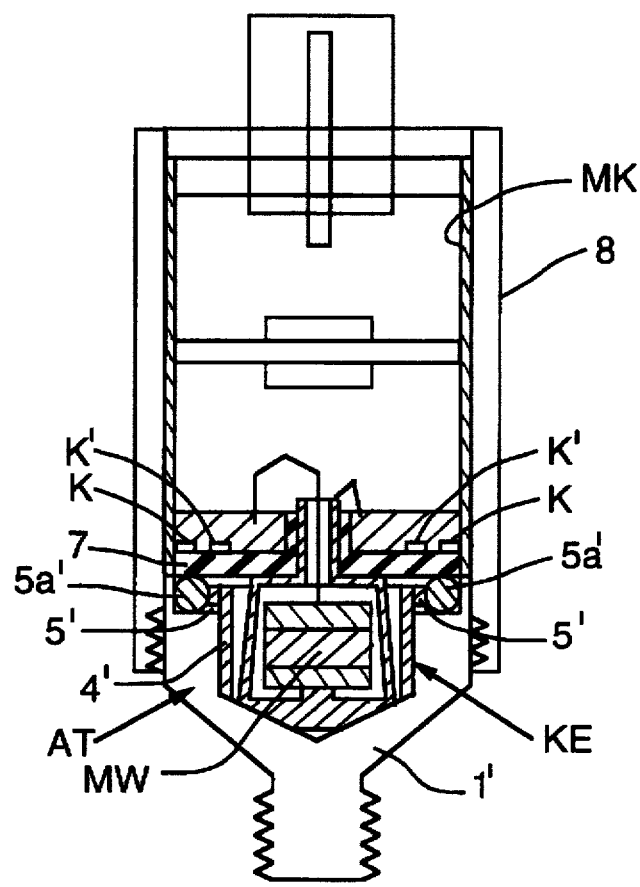
FIG. 5 the mounting piece per FIG. 4 with the lower part of the mounted measuring head in lengthwise section, along line V—V in FIG. 4.

The configuration per FIGS. 4 and 5 differs from those of FIGS. 1–3 only in that the holder 4' is introduced into a central hexagonal hole 1b in the base 1' and the encoding elements 5' with the expanded spherical pressure bodies 5a' stand out from it radially outwards instead of inwards. Also, in this case, the pressure bodies 5a' of the encoding elements 5', with the measuring head MK fitted between the end surface of the base 1' and the conductive rubber layer 7, are able to be supported and can exert a deformation pressure on the conductive rubber layer 7 between the respective contacts K, K'.

In the sample embodiment per FIGS. 4 and 5, the outer contour of the base 1' can be round at its free end, since this can be screwed into the machine 3 by means of an Inbus wrench. The round outer contour allows one to place the measuring head MK, as shown in FIG. 5, in a socket 8, which can be screwed onto the base 1'.

Theoretically, it makes no difference to the invention whether the switch embodying a binary 0 or a binary 1, depending on its status, and consisting of the contacts K, K', the conductive rubber layer 7 between them, and (so to speak) the presence or absence of a pressure element 5a (or resistors with a resistance value differing according to the status) are interrogated in parallel or in serial. Parallel interrogation has the advantage of greater speed, serial interrogation has the advantage that only one bipolar line is needed to transmit the interrogation signals to the computer. The circuit shown in FIG. 6 accomplishes a serial interrogation, followed by automatic switch from the recognition cycle to the measurement phase.

Figure 6:
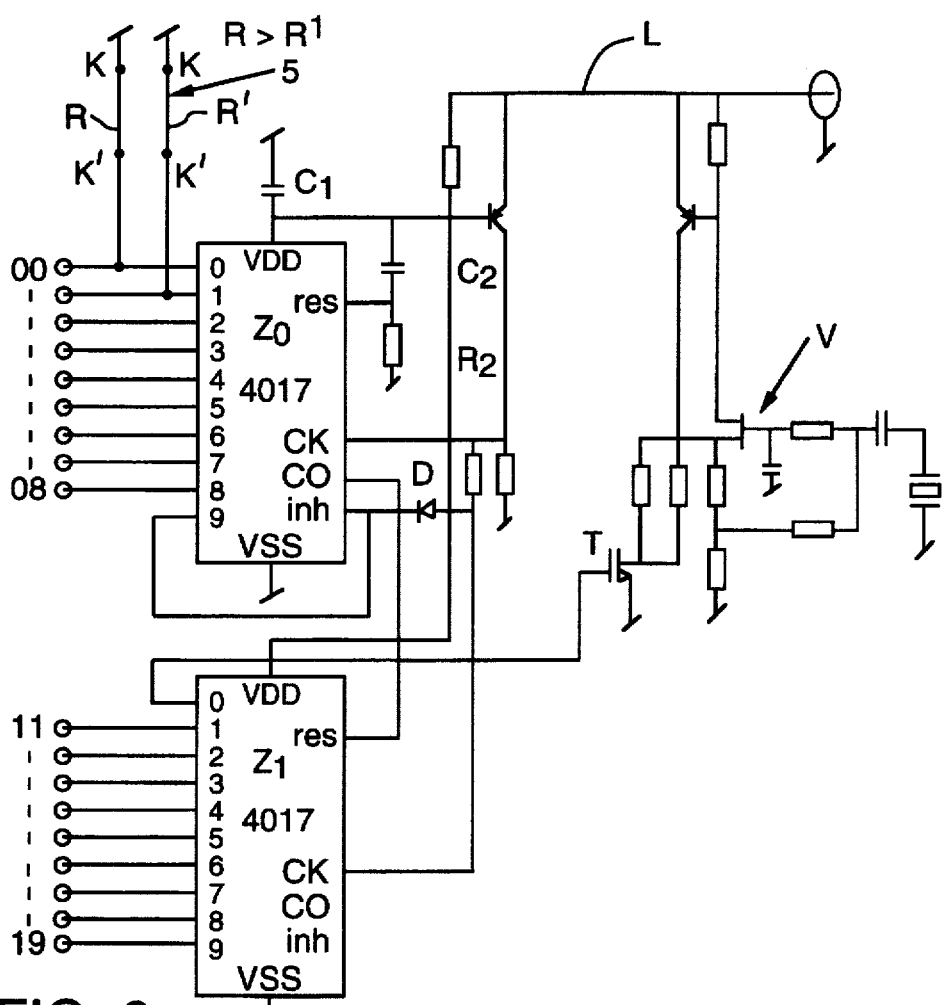
FIG. 6 a multiplexer circuit for use in connection with the mounting piece and measuring head per FIGS. 1–3 of FIGS. 4 and 5.

The circuit per FIG. 6 is located inside the measuring head MK and functions like a multiplexer, which makes it possible, in conjunction with the switches each consisting of an encoding element 5 or 5' and a pair of contacts K, K' to generate an encoded pulse train, whose serial encoding corresponds to the parallel encoding presented at the particular measuring site MS by means of the encoding element 5 or 5'.

In the circuit arrangement per FIG. 6, two decimal counters Z0 and Z1 (e.g., type 4014) are hooked up so that the circuit arrangement works like a multiplexer with 18 parallel inputs 00–08 and 11–19, and the serial output to line L. Twelve of these parallel inputs 00–08 and 11–19 are connected to the above-described switches, each consisting of a pair of contacts K, K'with conductive rubber layer 7 extending between them, and affected and unaffected by the encoding element 5, so that the magnitude of the loads affecting the individual parallel inputs depends on the particular circuit condition of the particular switch. In the present example, showing only the 0 line of the counter Z0, each pair of contacts K, K' with the conductive rubber layer 7 extending between them is switched directly between the particular parallel input and the ground, so that basically it is only the conductive rubber layer 7 with its particular status condition that determines the resistance connected between the ground and the wire in terms of its magnitude. This resistance has one value for one connection status of the switch that is clearly different from that in the other connection status of the switch.

The circuit per FIG. 6 works as follows:

At the beginning of a recognition cycle, the capacitors C1 and C2 are discharged, so that when the computer (not shown) abruptly applies a voltage to initiate this cycle across the line L, these capacitors are charged and a reset pulse arrives at the res-input, which sets the upper counter Z0 and, across its CO line and the res-line of the counter Z1, also the latter at "0", i.e., it brings about a connection status in which the particular 0 wires have a different potential from the other 1–9 wires. In the present example, the latter remain at the ground potential, while the potential at the "0"wire is increased to the power supply voltage at the VDD wire, but in any case to a value of predetermined magnitude, considerably different from zero.

The voltage applied by the computer across the line L to the circuit in the beginning is briefly interrupted (in the present example, for 20 µs) after a predetermined cycle time which in the present example amounts to 5 ms. The brief interruption of the energy supply across line L results in a clock pulse, which is activated on the CK wire of the counter Z0, which sets the wire 1 of the counter Z0 and resets the wire 0 to the ground potential. Since the wire 9 of the counter Z0 happens to be at ground potential at this time, the diode D is in the conducting state, so that the aforesaid clock pulse is kept away from the CK-wire of the counter Z1 and the latter remains in the condition set at the start of the recognition cycle, in which all of its wires, including the 0-wire, are at ground potential.

The power supply of the two counters Z0 and Z1 is maintained, despite the brief computer-ordered interruption, since energy is stored in the circuit by means of the capacitor C1.

Since the capacitors C1 and C2 are charged and the resistance R2, across which the res-input of the counter Z0 is switched to ground, is designed so that the charge on the capacitor C2 is hardly changed during the brief time of the interruption, this interruption also has no influence on the res-input.

The first interruption is followed by other ones at regular, computer-controlled intervals of 5 ms, until the wires 0–8 of the counter Z0 have all been switched consecutively. Then, as can be seen from FIG. 6, the next interruption will activate the wire 9 of this counter; since this is permanently connected to the inh-wire of the counter 0, the counter Z0 is maintained in a condition in which all wires 00–08 are inactive.

With the rise in potential at the inh-input, the diode D is placed in the nonconducting state, so that now the clock pulses produced by the continuing sequence of interruptions act on the wire CK of the counter Z1 and from that time on they can continue to periodically switch it, while the counter Z0 stays still on account of the continuing excitation of its inh-wire. A short period is enough to activate the wire 9 of the counter Z0 and initiate the further switching of the counter Z1. The positive pulse between the standard pulses of 5 ms duration, influenced by the counter 1 or counter 0, can therefore be much shorter than this. In the present example, the period is set at 20 µs, and therefore it is easily distinguishable from the actual standard pulses.

With the first interruption after the activation of the inh-wire of the counter 0, the counter Z1 is switched from wire 0 to wire 11, i.e., it activates wire 1, while the other wires of the counter Z1, as well as those of the counter Z0, remain inactive. In the same way as for counter Z0, for counter Z1 in turn each continuing interruption deactivates the wire that was active until then and activates the next following one, so that for the duration of the recognition cycle only a single one of all the wires 0–8 of the counter Z0 and the wires 1–9 of the counter Z1 is ever activated, i.e., set at voltage. Therefore, and because of the circumstances described hereafter, the aforesaid wires of the two decimal counters form the parallel inputs 00–08 and 11–18 of a multiplexer and the parallel-connected power supply wires VDD of its serial output.

The energy consumption of the two counters Z0 and Z1 is comprised of a basic consumption and an additional consumption, the latter being caused by the load present at the particular switched parallel connection. The basic consumption is the consumption of the two counters Z0 and Z1 when the power supply voltage is present at VDD and none of the "parallel inputs" (which represent counter outputs during normal operation of the counter) of the two counters are switched.

The voltage applied by the computer is adjusted to a permanent value, so that the magnitude of the load present on the particular switched parallel connection of the counters Z0 and Z1 is mirrored by the amplitude of the current flowing through line L, which is composed of the basically unchanging ground current and additional load-dependent current. A smaller load resistance produces a larger additional current and, thus, a larger overall current than does a larger resistance.

Since the resistance at each of the aforesaid parallel connections depends on the status of the corresponding conductive rubber layer, the current in the line L contains information on the particular setting of the corresponding encoding element 5 or 5' and, given sufficient difference between its two possible different values, can be used to determine the value 0 or 1 of a binary digit in a binary number, the number of its digits corresponding to the number of parallel inputs used for encoding the measuring sites. In the sample embodiments of the mounting piece AT per FIGS. 1–5, there are twelve of these (as already noted), which gives 4096 different encoding possibilities for the respective 12-digit pulse train.

Figure 7:
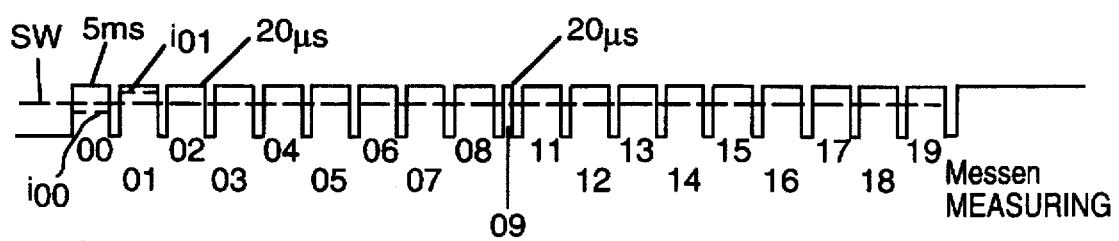
FIG. 7 a diagram showing the time course of current and voltage on line L of the circuit per FIG. 6.

As already explained, in the sample embodiments shown in FIGS. 1–5 of the mounting pieces AT, in addition to the encoding elements 5, 5' used to produce the characteristic data of the measuring sites, other elements are used for remote detection of the relative angle position of the mounting piece AT and the measuring head MK in the assembled condition. These encoding elements 9 are likewise assigned to their own parallel inputs of the multiplexers and accomplish functions which are identical to those used for the encoding of the measuring sites, so that the relative angular position can also be expressed in a correspondingly encoded segment of the binary coded pulse train shown in FIG. 7, which can be evaluated by the computer.

It does not matter that the two possible current values have exactly the same value from one parallel connection to another. It is enough for the current value (e.g., $i_{01}$) for the one status differ significantly from the current value (e.g., $i_{00}$) for the other status and, furthermore, one current value at all parallel inputs must be significantly lower, and the other significantly higher, than a common threshold value SW. It has been found that a difference of 10% is enough.

The measurement phase comes automatically after the recognition cycle. This is accomplished in that, with the switching pulse that is generated by the next interruption after the last marking pulse 19, the wire 0 of the counter Z1 is again activated and, consequently, the amplifier V is turned on via the transistor T and it now sends the signal from the measurement transducer MW to the line L. The measurement process can be automatically terminated after a predetermined time, after which the device is shortly returned to the starting condition with capacitors C1 and C2 discharged.

Figure 8:
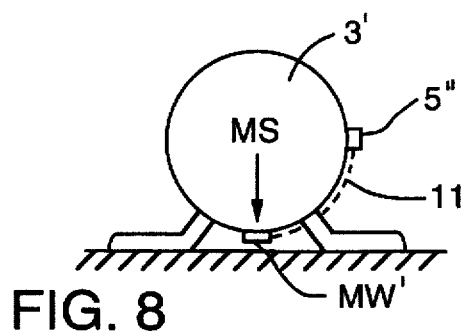
FIG. 8 a schematic representation of a modification of the invented device.

FIG. 8 shows a modification of the devices per FIGS. 1–7 in which the measurement transducer MW is built into the measuring head MK. The modification makes it possible to interrogate even measuring sites inaccessible to the measuring head.

In the modified design, the measuring site MS is situated on the machine directly above the foundation instead of the usual mounting piece, at this measuring site an encapsulated measurement transducer MW' is firmly joined to the machine 3'. The measurement transducer MW' is connected across a line 11 to one part of a plug and socket joint ST, situated in a mounting piece AT', which in other respects is designed similar to that described above and is able to interact with the measuring head MK in the same way as that. So that the measuring head can also interact with the modified configuration, it is equipped with the counterpart GST of the plug and socket connection ST located in the mounting piece AT' (FIG. 2), the arrangement being such that the outside measurement transducer MW' instead of the position installed in the measuring head MK as shown in FIG. 6 is automatically connected to the amplifier V if the plug and socket connection parts ST and GST are mated when the measuring head is placed on the altered mounting piece AT'.

FIG. 1 shows, as an example, a layout with three machine cycles M1, M2 and M3, and three motors ND, HD, MD, respectively behind (h), in front (v), and in the middle (m), each with three measuring sites on the transmission GT, take-off shaft A, bearing L, housing GH and foundation F, and how to assign the encoding elements 5 to the many measuring sites for protection of the mechanical vibrations in vertical (v), horizontal (h), and axial (ax) direction, so that they may be distinguished, and how they should be labeled. In the case of the labels, such as "m" between "h" and "v", located in the middle between two assignments, the two encoding elements 5 are used in the same way (e.g., LL) while the other two assignments the encoding elements are used with settings different from each other (OL or LO). FIG. 9 is a flow chart illustrating a method of identifying a measuring site on a machine in accordance with the present invention.

What I claim is:

1. A method of identifying a measuring site on a machine, comprising the steps of:

defining a plurality of encoding elements, with each encoding elements having a plurality of working conditions, and each encoding element is defining in one of the working conditions;

engaging a plurality of contact units with the plurality of encoding elements, so that each contact unit reflects the working conditions of an encoding element;

generating an electric signal for each contact unit, the electric signal being indicative of the working condition of the encoding element, wherein the electrical signal is generated by:

providing an input signal to the contact unit, the input signal having a magnitude, and influencing the magnitude of the input signal as a function of the working condition of the encoding element to generate the electric signal by varying the resistance of a conductive pathway for the input signal; and identifying the measuring site based on the electric signals representative of the working conditions of the encoding elements.

2. The method of claim 1, further comprising, before the step of engaging, the step of calibrating the contact units.

3. The method of claim 2, wherein the step of calibrating the contact units comprises the steps of:

engaging the contact units with a known engagement pattern;

generating an electric signal for each contact unit;

determining whether the electric signals generated by the contact units correspond to the known engagement pattern; and providing corrective factors to the signals from the contact units which do not correctly reflect the known pattern.

4. A system for producing signals identifying a measuring site on a machine, comprising:

a mounting piece attached to the machine;

a plurality of encoding elements attached to said mounting piece and arranged in a fixed special pattern, with each said encoding element having a plurality of working conditions, and with said encoding elements collectively acting as an identification of the measuring site;

a head assembly which is constructed to be removeably engaged to said mounting piece;

a plurality of contact units attached to said head assembly; with each contact unit corresponding to one encoding element;

means carried by said head assembly for generating a plurality of electric signals corresponding to said contact units, the electric signals being indicative of the working conditions of said encoding elements;

means for receiving the electric signals; and means for identifying the measuring site based on the electric signals representative of the working conditions of the encoding elements.

5. The system of claim 4, wherein said means for generating a plurality of electric signals comprises:

means for multiplexing the plurality of signals into a multiplexed signal; and means for providing the multiplexed signal to said means for receiving the electric signals.

6. The system of claim 5, wherein said means for multiplexing comprises a counter circuit.

7. The system of claim 6, additionally comprising a power supply line which provides power to said means for multiplexing, and wherein said power supply line further comprises said means for providing the multiplexed signal to said means for receiving the electric signals, and wherein said means for multiplexing further comprises a means for multiplexing the plurality of signals into a multiplexed signal in response to controlled interruptions of the power provided on said power supply line.

8. The system of claim 7, wherein said contact units each further comprises a conductive pathway having a resistance, the resistance of each conductive pathway varies when said conductive pathway is engaged by one of said encoding elements, and the variation of the resistance of the conductive pathway is a function of the working condition of said encoding element.

9. The system of claim 8, wherein the resistance of said conductive pathway is a function of pressure applied to said conductive pathway.

10. The system of claim 9, wherein each said contact unit further comprises:

a first electric contact located at one end of each said conductive pathway, said first electric contact for receiving a source of electricity; and a second electric contact located at another end of each said conductive pathway, said second electric contact for providing the electric signal from each said contact unit.

11. The system of claim 9, wherein said mounting piece further comprises a holder attached to said encoding elements, said holder and said encoding elements being removable from said mounting piece.

12. The system of claim 11, wherein said mounting piece has a contact surface for receiving said head assembly.

13. The system of claim 4, further comprising:

a set of mounting elements attached to said mounting piece, said set of mounting elements having a plurality of working positions;

an additional set of contact units corresponding to said set of mounting elements;

means for generating a mounting signal from said additional set of contact units, the mounting signal being indicative of the working conditions of said set of mounting elements;

means for receiving said mounting signal; and means for determining from said mounting signal a relative position of the apparatus in the mounting piece.

14. The system of claim 4, further comprising a measuring device attached to said head assembly and engaging the machine when said head assembly engages said mounting piece.

15. The system of claim 4, further comprising a measuring device attached to the machine and connected at said mounting piece via a cable fitted with a connector at said mounting piece, said connector engaging a complimentary connector in said head assembly.

16. The system of claim 4, wherein said encoding elements are removable from said mounting piece, and each encoding element has two working conditions, one working condition when said encoding element is not removed from said mounting piece, and another working condition when said encoding element is removed from said mounting piece.

17. The system of claim 4, additionally comprising:

a measuring device which measures a condition at the measuring site and generates measured data; and said means for generating a plurality of electric signals generates a plurality of electric signals which are both indicative of the working conditions of the encoding elements and which are indicative of the measured data.

18. An apparatus for producing signals identifying a measuring site on a machine carrying a mounting piece, a plurality of encoding elements attached to the mounting piece and arranged in a fixed special pattern, with each encoding element having a plurality of working conditions, and with the encoding elements collectively acting as an identification of the measuring site, comprising:

a head assembly which is constructed to be removeably engaged to the mounting piece;

a plurality of contact units attached to said head assembly; with each contact unit corresponding to one encoding element;

means carried by said head assembly for generating a plurality of electric signals corresponding to said contact units, the electric signals being indicative of the working conditions of the encoding elements;

means for receiving the electric signals; and means for identifying the measuring site based on the electric signals representative of the working conditions of the encoding elements.

* * * * *